(12) United States Patent
Li et al.

(10) Patent No.: US 12,163,543 B2
(45) Date of Patent: Dec. 10, 2024

(54) RIVET WITH IMPROVED STRUCTURE FOR FORMING FLAT-BOTTOM RIVETING OF PLATES

(71) Applicant: SHANGHAI JIAO TONG UNIVERSITY, Shanghai (CN)

(72) Inventors: Yongbing Li, Shanghai (CN); Yunwu Ma, Shanghai (CN); Ming Lou, Shanghai (CN); He Shan, Shanghai (CN); Bingxin Yang, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 188 days.

(21) Appl. No.: 18/165,251

(22) Filed: Feb. 6, 2023

(65) Prior Publication Data

US 2023/0184281 A1 Jun. 15, 2023

Related U.S. Application Data

(63) Continuation of application No. PCT/CN2022/130157, filed on Nov. 5, 2022.

(51) Int. Cl.
 *F16B 19/10* (2006.01)
(52) U.S. Cl.
 CPC .......... *F16B 19/1027* (2013.01); *F16B 19/10* (2013.01)
(58) Field of Classification Search
 CPC .. F16B 5/04; F16B 19/00; F16B 19/04; F16B 19/08; F16B 19/086; F16B 19/10; F16B 19/1027; F16B 21/00; B29C 66/8322

USPC .......................................... 411/500, 501, 503
See application file for complete search history.

(56) References Cited

U.S. PATENT DOCUMENTS

| | | | | |
|---|---|---|---|---|
| 7,628,573 | B2* | 12/2009 | Philipskotter | F16B 19/086 411/501 |
| 11,440,083 | B2* | 9/2022 | Werkmeister | B23K 20/2336 |
| 11,833,576 | B2* | 12/2023 | Jones | F16B 19/086 |
| 2009/0269165 | A1* | 10/2009 | Fujii | F16B 19/086 411/503 |
| 2013/0094924 | A1* | 4/2013 | Lee | F16B 19/086 411/502 |
| 2014/0242373 | A1* | 8/2014 | Campbell | B32B 27/20 411/501 |
| 2015/0056042 | A1* | 2/2015 | Marxkors | B21J 15/025 227/62 |
| 2015/0082607 | A1* | 3/2015 | Diehl | F16B 19/086 411/501 |
| 2017/0343027 | A1* | 11/2017 | Wissling | B21J 15/36 |
| 2018/0094660 | A1* | 4/2018 | Mayer | F16B 19/086 |

(Continued)

*Primary Examiner* — Roberta S Delisle
(74) *Attorney, Agent, or Firm* — CBM PATENT CONSULTING, LLC

(57) ABSTRACT

A rivet with improved structure for forming flat-bottom riveting of plates, which comprises a rivet cover, a rivet shoulder and a rivet body; specifically, the rivet cover is provided with a torque transmission structure and a positioning structure for driving the rivet to rotate; the rivet body comprises an inner cavity of the rivet body, an outer wall of the rivet body and an end of the rivet body; with the present invention, the bottom surface of the joint can be flush with the surface of the connected plates, which facilitates the subsequent processing of the coverage on the bottom surface, reduces the wind resistance coefficient of the joint, and broadens the application range of the process.

10 Claims, 5 Drawing Sheets

(56) References Cited

U.S. PATENT DOCUMENTS

2019/0277320 A1* 9/2019 Cipriano .................. F16B 5/04
2020/0332818 A1* 10/2020 Sun ....................... B21J 15/025

* cited by examiner

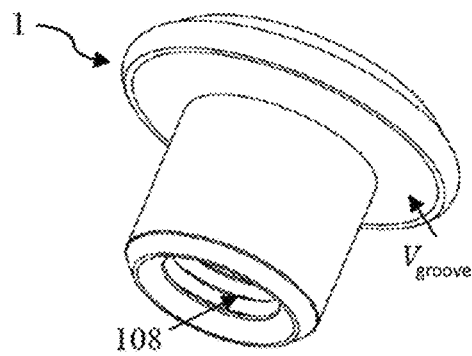
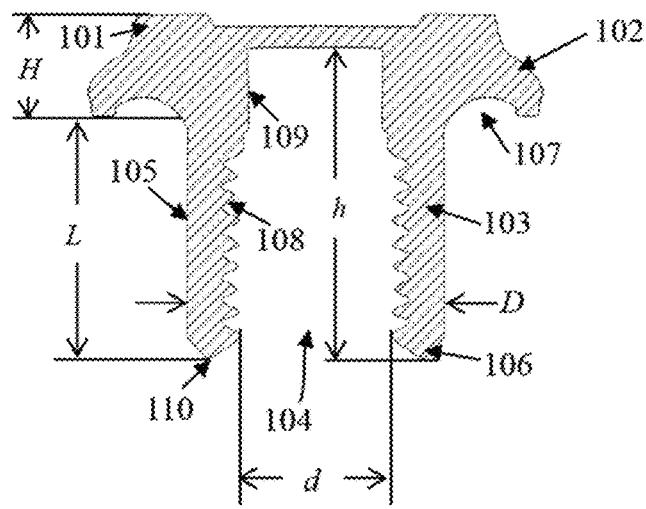
Fig. 1A
Fig. 1B
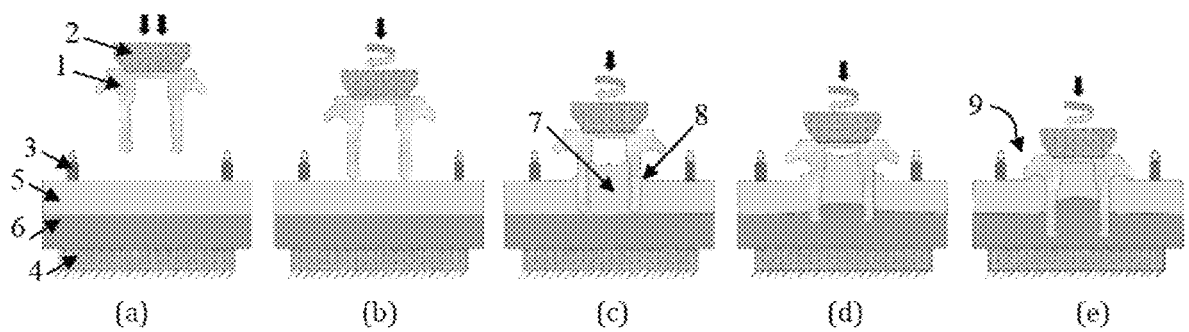
(a)     (b)     (c)     (d)     (e)
Fig. 2A    Fig. 2B    Fig. 2C    Fig. 2D    Fig. 2E

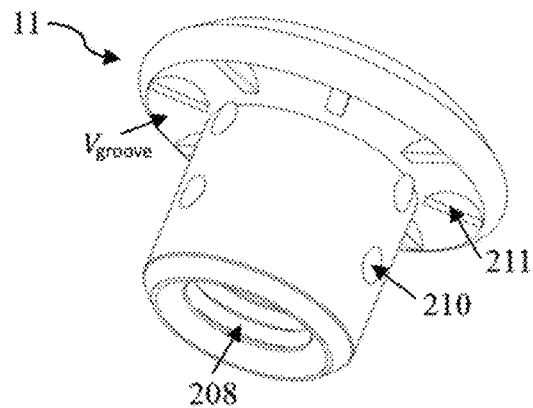
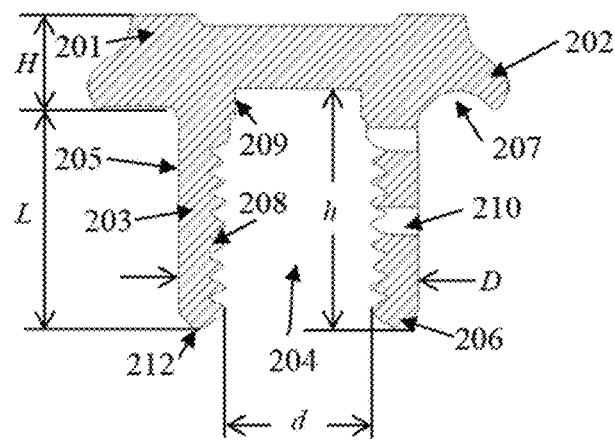
Fig. 5A
Fig. 5B
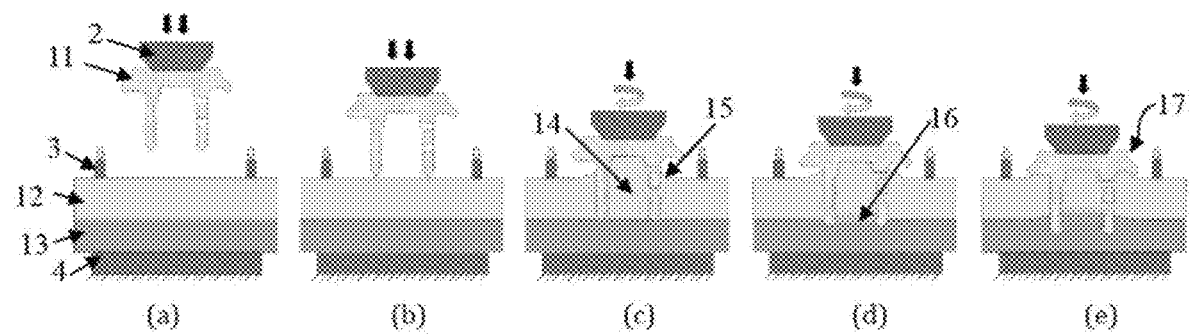
Fig. 6A  Fig. 6B  Fig. 6C  Fig. 6D  Fig. 6E a b

RIVET WITH IMPROVED STRUCTURE FOR FORMING FLAT-BOTTOM RIVETING OF PLATES

CROSS-REFERENCE TO RELATED APPLICATIONS

This application is the continuation application of International Application No. PCT/CN2022/130157 filed on 5 Nov. 2022 which designated the U.S. and claims priority to Chinese Application No. CN202111342601.7 filed on 12 Nov. 2021, the entire contents of each of which are hereby incorporated by reference.

FIELD OF TECHNOLOGY

The present invention relates to a technology in the field of material joining; specifically, it is a rivet with improved structure used for forming flat-bottom riveting of plates.

PRIOR ART

The existing spot joining methods include pre-drilled hole riveting and non pre-drilled hole riveting. However, the former not only brings additional processes, but also seriously affects the sealing of the joint and the ability to resist electrochemical corrosion while the latter requires the use of a support die with a concave convex structure to guide the deformation of the lowest layer connected materials. Although the bottom of the finally obtained joint is not penetrated, the bottom of the joint protrudes from the surface of the connected material, and the bottom surface cannot be flat. The bulge at the bottom of the joint will affect the wind resistance coefficient and other performance indexes, leading to the service performance of the joint greatly being reduced. In addition, in connection scenarios where the lowest layer materials are light alloys with low ductility at room temperature, such as 7 series aluminum alloys, magnesium alloys, and cast aluminum, or materials that are difficult to deform, such as plastics and resin matrix composites, as well as thin plates, the large plastic deformation during riveting without pre-dilled holes are likely to crack the materials and seriously affect the service performance of joints.

In addition, in order to obtain an ideal interfering interlock effect, a relatively large impact force is needed to be applied to riveted joints to deform the rivets, which makes extremely high requirements for the structural strength and stiffness of riveting equipment, the reliability of the punching component and the strength of the rivets themselves, and makes serious wear and tear of punches and dies.

According to prior arts, Chinese patent document No. CN105728627A, published on Jul. 6, 2016, discloses a flat-bottom punching and riveting connection process of a sheet with a raised inward turning rivet in the center. In the process, before the start of flat-bottom punching and riveting connection, the upper and lower plates are pressed on the lower die with flat and smooth upper surface by a blank holder. The center of the blank holder is provided with a rivet whose center is provided with a bulge. The bottom of the rivet is turned inward. The upper end of the rivet contacts the punch; at the beginning of the flat-bottom punching and riveting connection, the punch presses the rivet into the upper sheet to deform the upper and lower plates. As the upper and lower plates are pressed by the blank holder, the material of the sheet cannot flow outward. During the deformation of the upper and lower plates, the material of the plates will flow into the rivet, and the material flow of the lower sheet will squeeze the material of the upper sheet into the rivet. Thus, the middle of the lower sheet is raised upward to form an internal convex point and embedded into the upper sheet to form a mechanical interlocking, so that the upper and lower plates are connected together. The lower surface of the lower sheet is always flat. However, this technology requires large deformation when riveting the upper sheet. When it is applied to riveting materials that are difficult to deform, it cannot solve the problem of material cracking caused by large deformation.

Chinese patent document No. CN112555254A, published on Mar. 26, 2021, discloses a connection method and rivet structure of ceramic matrix composites. The method comprises the following steps: firstly, a ceramic matrix composite rivet, which comprises an outer part of the rivet and an inner part of the rivet is prepared; secondly, the first and second ceramic matrix composite components to be connected, which have rivet holes and countersunk head holes, are combined; thirdly, the rivet outer parts are loaded into the rivet holes of the first and second ceramic matrix composite components; fourthly, the gap between the outer cylindrical surface of the rivet hole of the rivet outer part and the rivet hole of the first and second ceramic matrix composite components is filled with silicon carbide matrix; then, screw the rivet inner part into the rivet outer part; after that, the silicon carbide matrix is filled in the thread engagement gap between the rivet inner part and the rivet outer part; finally, trim the profile of the connection area is trimmed to complete the connection of ceramic matrix composites; the present invention can reduce the influence of the connection on the surface shape of the component, and improve the ability to resist heat mismatch and vibration, and greatly improve the strength and reliability of the connection. However, this technology requires pre-drilled holes before riveting, which not only brings additional processes, but also seriously affects the sealing of joints and the ability to resist electrochemical corrosion.

SUMMARY OF THE INVENTION

Aiming at the joint bottom protruding from the surface of the connected materials obtained by the existing riveting process that affects the aerodynamic performance of the structure when the outer covering part is connected, and the bumps on the bottom are not conducive to the subsequent covering process when applied to internal component connection, the present invention proposed a rivet with improved structure for forming flat-bottom riveting of plates, which can realize that the bottom surface of the joint is flush with the surface of the connected material. It is convenient for subsequent covering processing on the bottom surface, reduces the wind resistance coefficient of the joint, and broadens the application range of the process. At the same time, the mechanical interlocking formed between the interlocking structure on the rivet body and the connected materials can strengthen the joint performance. In addition, the method can realize either a detachable joint or a non-detachable joint depending on the actual needs, and it has excellent flexibility.

The present invention is realized by the following technical scheme:

The present invention relates to a rivet with improved structure for forming flat-bottom riveting of plates, which comprises a rivet cover, a rivet shoulder and a rivet body, wherein the rivet cover is provided with a torque transmission structure and a positioning structure for driving the rivet to rotate; the rivet body comprises an inner cavity of the rivet body, an outer wall of the rivet body and an end of the rivet body.

The length L of said rivet body and the thickness and layer of the workpiece to be connected meet the formula $\Sigma_{i=1}^{n-1} t_i < L < \Sigma_{i=1}^{n} t_i'$, wherein $t_i$ is the thickness of the i-th layer of the workpiece to be connected, n is the number of layers of the workpieces to be connected, and n≥1; thus, the workpieces to be connected can be locked, and the rivet cannot penetrate the workpieces at the lower layer.

The nth layer of said workpieces to be connected is the workpiece whose surface is required to be flat after the riveting is completed.

The said workpieces to be connected are plates, profiles or castings placed in layers.

The inner cavity depth of said rivet body h meets the following requirements: h−L≤H, wherein H is the thickness of the rivet cover, D is the outer wall diameter of the rivet body, and d is the inner cavity diameter of the rivet body. Thus, the effect of containing the deformed workpiece material in the rivet inner cavity is realized.

The inner and outer walls of said rivet body are provided with a rivet body penetration structure, which can form a plurality of through holes on the rivet body and these holes are used to discharge the to-be-connected materials trapped in the inner cavity of the rivet body to the outside of the body during the riveting process, so as to prevent forming gaps between the workpieces or deformation of the bottom of the joint as a result of trapped materials squeezing the workpieces to be connected once the cavity of the rivet body is filled with such materials.

Said through holes are preferably 3-6, which are distributed evenly along the circumference of the rivet body, with a diameter of 0.8-1.2 times of the thickness of the rivet body wall. The through holes are filled with the workpiece material to be connected in the final joint process, which forms mechanical interlocking, improves the locking force of the joint, and prevents the joint from loosening.

The said rivet shoulder is provided with a groove for holding the extruded materials from the workpieces to be connected during the riveting process.

$$V_{groove} = k_1 \frac{\pi(D^2 L - d^2 h)}{4},$$

The groove has a volume of wherein D is the outer wall diameter of the rivet body, d is the inner cavity diameter of the rivet body, L is the length of the rivet body, h is the cavity depth of the rivet body, $k_1$ is the correction factor and $1.0 < k_1 \le 1.2$. Thus, it can realize the effect that said groove fully holds the workpiece material extruded by the rivet body.

The said rivet shoulder is further provided with some stiffeners, which are embedded into the workpieces to be connected in the final joint process to realize the fastening of the joint in the circumferential direction.

The said stiffeners are a plurality of stiffeners uniformly distributed in a circumferential direction or a discontinuous stiffeners distributed in a circular ring with the axis as the center.

The said outer wall of rivet body and the inner cavity of the rivet body are preferably provided with an interlocking structure, which is thread, ring groove, vertical groove, convex head or a combination thereof, and is used to form interlocking structure with the connected material to prevent loosening of the joint.

The present invention relates to a spot joining device based on the above rivet with improved structure, which comprises a driving component, a blank holder and a support mechanism, wherein the semi-hollow rivet, the driving component and the blank holder are coaxially arranged on one side of the workpiece to be connected, the semi-hollow rivet is located in the blank holder and engaged with the driving component, and the support mechanism is located on the other side of the workpiece to be connected; the driving component drives the semi-hollow rivet to perform axial linear movement and/or circumferential rotary movement;

The contact surface between said support mechanism and the nth layer of workpiece is a plane, and the projection area of the contact surface in the direction of the rivet axis covers the projection area of the entire rivet.

The present invention relates to a spot joining method based on the above spot joining device, which uses rivet with improved structures to form a flat-bottom non-detachable joint, and comprises the following steps:

1) Process preparation: the workpieces to be connected are stacked on the support mechanism and are pressed by a blank holder;
2) Contact stage: the driving component axially feeds until the end of the rivet body of the rivet is located above the surface of the workpiece to be connected and the driving mechanism drives the semi-hollow rivet to feed along the axial direction at the same time according to the predetermined process parameters and rotate it to the workpiece to be connected until the semi-hollow rivet contacts the workpiece to be connected.
3) Cutoff stage: under the action of axial movement and rotary movement, the semi-hollow rivet pierces into the workpiece to be connected and cuts off all workpieces except the one at the nth layer. Part of the cut material flows along the outer wall of the rivet body to the surface of the workpiece to be connected outside the semi-hollow rivet, and the other part is held by the inner cavity of the rivet body to form the retained material; after filling the inner cavity of the rivet body, the retained material flows along the penetration structure of the rivet body to the outside of the rivet body, reducing the gap between the workpieces to be connected due to the extrusion of the retained material or the deformation of the bottom of the workpiece to be connected at the nth layer;
4) Welding stage: when the semi-hollow rivet pierces into the workpiece to be connected at the nth layer, the rotation and feed parameters of the semi-hollow rivet will be adjusted to make the friction heat generation greater than the heat threshold, and the retained material will be welded with the workpiece to be connected at the nth layer under the action of the friction heat, and the retained material in the inner cavity of the rivet body will integrate with the workpiece to be connected at the nth layer as a whole;
5) Pressing stage: the rivet shoulder contacts the workpiece to be connected, the extruded material is held by the groove of the rivet shoulder, and the workpiece to be connected is pressed;

Completion of process: when the semi-hollow rivet reaches the predetermined depth, the movement will stop. The driving component will feed backward and return to the original position; the blank holder will be released, and a flat bottomed and non-detachable joint will be formed.

Measure the reaction force (F) and reaction torque (M) on the driving head, record the process time (Δt), and calculate the total energy input Q. When the total energy input Q is greater than the preset heat threshold ($Q_0$), i.e. $Q=\int_0^{\Delta t} F \times f dt + \int_0^{\Delta t} M \times \omega dt > Q_0$, where F is the reaction force on the driving head, M is the reaction torque on the driving head, f is the rivet feed rate at the first stage of the process, ω is the rivet rotation speed at the first stage of the process, Δt is the process time), in said welding stage and pressing stage, the inner wall of the rivet body may expand and deform under the action of retaining material pressure, which may enhance the mechanical interlocking between the rivet body and the workpieces to be connected.

At least one of the following types of welding is formed in said flat bottomed and non-detachable joint:
 a) The welding formed by retained material in the rivet body cavity and the nth layer of workpiece to be connected;
 b) The welding formed between the workpieces to be connected outside the rivet body;
 c) The welding formed between the rivet body and the workpiece to be connected.

At least one of the following types of mechanical interlocking is formed in said flat bottomed and non-detachable joint:
 a) The mechanical interlocking formed between the interlocking structure of the rivet body cavity and the workpiece to be connected;
 b) The mechanical interlocking formed between the interlocking structure of the outer wall of rivet body and the workpiece to be connected;
 c) The mechanical interlocking formed between the rivet body penetration structure and the workpiece to be connected;
 d) The mechanical interlocking formed by the stiffener and the workpiece to be connected;
 e) The mechanical interlocking formed due to the expansion and deformation of the rivet body that increases the inner diameter of the rivet body.

The present invention relates to a spot joining method based on the above spot joining device, which uses rivet with improved structures to form a flat bottomed and non-detachable joint, and comprises the following steps:
 1) Process preparation: the workpieces to be connected are stacked on the support mechanism and are pressed by a blank holder;
 2) Contact stage: the driving component axially feeds until the end of the rivet body of the rivet is located above the surface of the workpiece to be connected and the driving mechanism drives the semi-hollow rivet to feed along the axial direction at the same time according to the predetermined process parameters and rotate it to the workpiece to be connected until the semi-hollow rivet contacts the workpiece to be connected;
 3) Cutoff stage: under the action of axial movement and rotary movement, the semi-hollow rivet pierces into the workpiece to be connected and cuts off all workpieces except the one at the nth layer. Part of the cut material flows along the outer wall of the rivet body to the surface of the workpieces to be connected outside the semi-hollow rivet, and the other part is held by the inner cavity of the rivet body to form the retained material;
 4) Tightening stage: when the semi-hollow rivet pierces into the workpiece to be connected at the nth layer, the rotation and feed parameters of the semi-hollow rivet will be adjusted to make the friction heat generation smaller than the heat threshold.
 5) Pressing stage: the rivet shoulder contacts the workpiece to be connected, the extruded material is held in the groove of the rivet shoulder, and the workpiece to be connected is pressed;

Completion of process: when the semi-hollow rivet reaches the predetermined depth, the movement will stop. The driving component will feed backward and return to the original position; the blank holder will be released, and a flat bottomed and detachable joint will be formed.

The semi-hollow rivet used in said spot joining method for forming a flat bottomed and a detachable joint by using such semi-hollow rivet can work without the stiffener on the rivet body penetration structure and the rivet shoulder.

The rivet body interlocking structure of semi-hollow rivet used in said spot joining method for forming a flat bottomed and a detachable joint is any of the followings:\
 a) The threaded structure of the rivet body cavity;
 b) The threaded structure of the outer wall of the rivet body.

At least one of the following types of welding is formed in said flat bottomed and non-detachable joint:
 a) Threaded connection formed between the threaded structure of the rivet body cavity and the workpiece to be connected;
 b) Threaded connection formed between the threaded structure of the outer wall of rivet body and the workpiece to be connected;

The detachable function of said flat bottomed and a detachable joint can be achieved by reverse rotating the rivet.

Technical Effect

In the present invention, through the rivet body penetration structure with several through holes through the rivet body, the to-be-connected material trapped in the inner cavity of the rivet body is discharged to the outside of the rivet body during the riveting process, which prevents the trapped material from squeezing the workpieces to be connected after filling in the cavity of the rivet body, resulting in gaps between the workpieces to be connected or unevenness and deformation of the bottom of the joint.

Compared with the prior art, the present invention can obtain a joint whose bottom surface is flush with the surface of the connected material, reduces the wind resistance coefficient, and facilitates the subsequent covering processing on the bottom surface, thus expanding the application range of the process. The overall strength and stiffness of the joint are improved by the mechanical interlocking between the interlocking structure on the rivet body and the connected material, and by the welding between the rivet and the workpieces to be connected. After riveting, the bottom of the joint is not penetrated, ensuring the sealing of the joint and improving the corrosion resistance. By controlling the rivet structure design and the friction heat generated by rotation, the present invention can realize either detachable joint or non-detachable joint, and has good application flexibility. In the process of riveting, there is no need to achieve mechanical interlocking through the large deformation of rivets, which can greatly reduce the riveting force, the loss of punch and die, and the requirements of riveting process on the structural strength and stiffness of riveting equipment. In addition, it can increase the service life of equipment and reduce the maintenance cost of equipment.

BRIEF DESCRIPTION OF DRAWINGS

FIG. 1A is the 3D schematic diagram of the semi-hollow rivet in Embodiment 1;

FIG. 1B is the sectional schematic diagram of the semi-hollow rivet in Embodiment 1;

FIG. 2A is the schematic diagrams of the spot joining method in Embodiment 1, the process preparation stage;

FIG. 2B is the schematic diagrams of the spot joining method in Embodiment 1, the contact stage;

FIG. 2C is the schematic diagrams of the spot joining method in Embodiment 1, the cutting off stage;

FIG. 2D is the schematic diagrams of the spot joining method in Embodiment 1, the tightening stage;

FIG. 2E is the schematic diagrams of the spot joining method in Embodiment 1, the pressing stage;

FIG. 5A is the 3D schematic diagram of the semi-hollow rivet in Embodiment 2;

FIG. 5B is the sectional schematic diagram of the semi-hollow rivet in Embodiment 2;

FIG. 6A is the schematic diagrams of the spot joining method in Embodiment 2, the process preparation stage;

FIG. 6B is the schematic diagrams of the spot joining method in Embodiment 2, the contact stage;

FIG. 6C is the schematic diagrams of the spot joining method in Embodiment 2, the cutting off stage;

FIG. 6D is the schematic diagrams of the spot joining method in Embodiment 2, the tightening stage;

FIG. 6E is the schematic diagrams of the spot joining method in Embodiment 2, the pressing stage;

Figure 3:
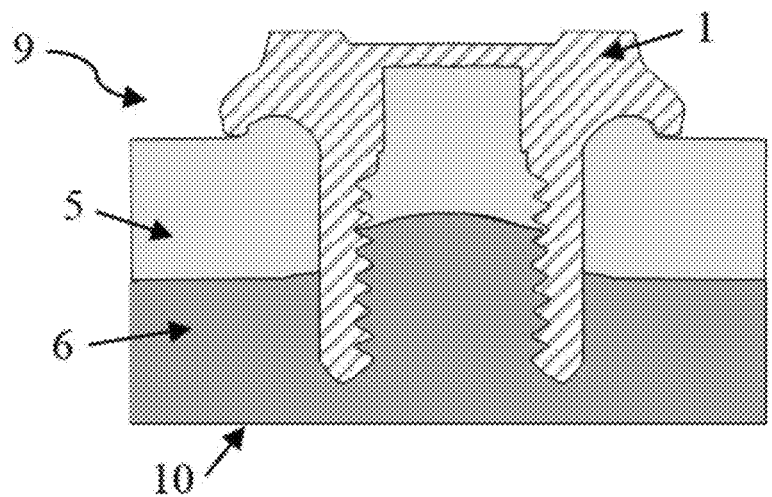
FIG. 3 is the effect diagram of Embodiment 1.

In the figure: semi-hollow rivet 1, driving component 2, blank holder 3, supporting mechanism 4, the upper layer of workpiece to be connected 5, the lower layer of workpiece to be connected 6, retained material 7, extrusion material 8, detachable joint 9, bottom surface of the joint 10, semi-hollow rivet 11, the upper layer of workpiece to be connected 12, the lower layer of workpiece to be connected 13, retained material 14, extrusion material 15; welding area 16; non-detachable joint 17, bottom surface of the joint 18, semi-hollow rivet 19, the upper layer of workpiece to be connected 20, the lower layer of workpiece to be connected 21, retained material 22, extrusion material 23, welding area 24, non detachable joint 25, bottom of the joint 26, rivet cover 101, rivet shoulder 102, rivet body 103, inner cavity of rivet body 104, outer wall of rivet body 105, rivet body 106, groove 107, inner cavity thread of rivet body 108, inner wall of rivet body 109, and the tapered angle 110, rivet cover 201, rivet shoulder 202, rivet body 203, inner cavity 204, outer wall 205, rivet body end 206, groove 207, inner cavity thread 208, inner wall 209, piercing structure 210, stiffener 211, wedge taper angle 212, rivet cover 301, rivet shoulder 302, rivet body 303, inner cavity 304, outer wall 305, rivet body end 306, groove 307, inner cavity thread 308, inner wall 309, stiffener 310, and wedge taper angle 311.

DETAILED DESCRIPTION OF THE INVENTION

Embodiment 1

As shown in FIG. 1A-B, the semi-hollow rivet 1 used in this embodiment comprises rivet cover 101, rivet shoulder 102 and rivet body 103, wherein rivet body 103 comprises rivet body cavity 104, rivet body wall 105 and rivet body end 106.

The said rivet body end 106 is provided with a wedge cone angle 110, with the cone angle vertex located between the rivet body wall 109 and the rivet body wall 105, and it is used to make the flow of the cut material to the inside and outside of the rivet body to avoid excessive accumulation of material at the inner side of the rivet body, which will result in the deformation of rivet body or joint bottom.

As shown in FIG. 2A-E, this embodiment relates to a spot joining method of forming a flat bottomed and detachable joint with the above semi-hollow rivet 1, wherein the upper layer of workpiece 5 to be connected is made of aluminum alloy 6061-T6 with a thickness of 3.5 mm, while the lower layer of workpiece 6 to be connected is made of magnesium alloy AZ91D with a thickness of 3.5 mm. This embodiment specifically includes the following steps:

1) Process preparation: The upper layer of workpiece 5 to be connected and the lower layer of workpiece 6 to be connected are stacked on the support mechanism 4 and are pressed by blank holder 3;

2) Contact stage: the driving mechanism 2, driven by two servo motors which are respectively used to realize axial feed motion and circumferential rotation motion, feeds axially until the end 106 of the rivet body is 3 mm away from the surface of the upper layer of workpiece 5 to be connected. The process parameters for the axial feed are as follows: the rivet rotates clockwise at a speed of 3000 rpm, the feed speed is 2 mm/s, and the semi-hollow rivet 1 is driven to feed and rotate close to the workpiece 5 to be connected at the same time, until the semi-hollow rivet 1 is connected with the upper layer of workpiece 5 to be connected;

3) Cutting stage: the semi-hollow rivet 1 pierces into and gradually cuts off the workpiece 5 to be connected on the upper layer. After the workpiece 5 to be connected at the upper layer is deformed, part of it flows along the outer wall 105 of the rivet body to the surface of the workpiece 5 to be connected onto the outer side of the semi-hollow rivet 1 to form extruded material 8, and the other part is held by the inner cavity 104 of the rivet body to form retained material 7;

4) Tightening stage: when semi-hollow rivet 1 is pierced into the lower part of the workpiece 6 to be connected, measure reaction force (F) and reaction torque (M) of driving mechanism 2, record process time ($\Delta t$), and calculate the total energy input Q: $Q=\int_0^{\Delta t} F \times f dt + \int_0^{\Delta t} M \times \omega dt$, wherein, F is the reaction force on the driving head, M is the reaction torque on the driving head, and f is the rivet feed rate at the first stage of the process, ω is the rivet rotation speed in the first stage of the process, Δt is the process time. When $Q=0.9Q_0$, the tightening phase ends. $Q_0$ is the energy threshold required for the band connecting material to form solid phase connection, and $Q_0=3.64J$ in this embodiment.

5) Pressing stage: the rivet shoulder 102 contacts the upper layer of workpiece 5 to be connected, holds the extrusion material 8 in the groove 107, and presses the upper layer of workpiece 5 to be connected; until the semi-hollow rivet 1 reaches the predetermined depth of 5.5 mm, the movement stops, and the drive component 2 will feed backwards and return to the original position. The blank holder 3 will be released, and a flat bottomed and detachable joint 9 will be formed.

As shown in FIG. 3, in the flat bottomed and detachable joint 9 obtained by the above process, the thread 108 of the inner cavity of the rivet body forms a threaded connection with the upper layer of workpiece 5 to be connected and the lower layer of workpiece 6 to be connected. The bottom surface of the joint is free of cracks and penetration and is flush with the surface of the workpiece to be connected, which improves the aerodynamic performance and corrosion resistance of the joint and expands the application scope of the process.

In this embodiment, the maximum riveting force in the riveting process of aluminum alloy 6061-T6 with a thickness of 3.5 mm and magnesium alloy AZ91D with a thickness of 3.5 mm is 6.6 kN, which is 84.5% lower than the existing riveting force of 42.5 kN using the traditional self-piercing riveting method, effectively reducing the loss of riveting equipment; the maximum tensile shear force of the joint is 5.9 kN, which is 43% higher than the existing self-piercing riveting process; the bottom of the joint is not penetrated, and is free of air leakage under the pressure of 5000 MPa, which solves the technical problem of poor sealing of the existing pre-drilled hole riveting technology.

Figure 4:
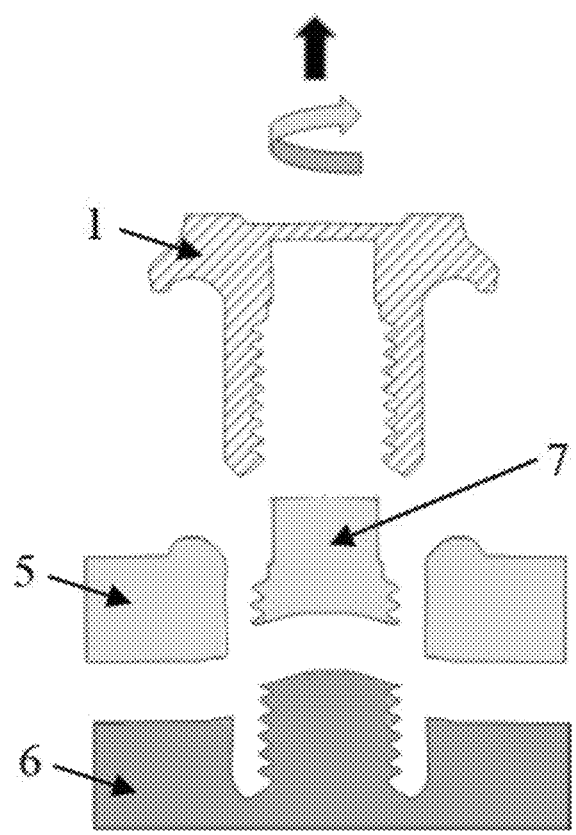
FIG. 4 is the disassembly diagram of Embodiment 1.

As shown in FIG. 4, the disassembly function can be realized by rotating the semi-hollow rivet 1 counterclockwise, and the separated upper layer of material 5 to be connected, the retained material 7, the lower layer material 6 to be connected and the semi-hollow rivet 1 can be obtained. Compared with the non-detachable characteristics of the existing riveting technology, the flexibility of the process is increased.

Embodiment 2

As shown in FIG. 5A-B, compared with Embodiment 1, in this embodiment, the rivet shoulder 202 is provided with eight stiffeners 211 evenly distributed along the circumference, and the rivet body 203 is provided with six through holes 210 through the rivet body, which are used to discharge the materials to be connected held in the inner cavity of the rivet body to the outside of the rivet during the riveting process, so as to prevent the trapped materials from squeezing the workpieces to be connected after filling the cavity of the rivet body, which will result in gaps between workpieces or uneven changes at the bottom of the joint.

As shown in FIG. 6A-E, this embodiment relates to a spot joining method of forming a flat bottomed non-detachable joint with a semi-hollow rivet 11, wherein, the upper layer of workpiece 12 to be connected is made of aluminum alloy 2219-T4 with a thickness of 3.0 mm, while the lower layer of workpiece 6 to be connected is made of magnesium alloy AZ91D with a thickness of 2.5 mm. This embodiment specifically includes the following steps:

1) Process preparation: The upper layer of workpiece 12 to be connected and the lower layer of workpiece 13 to be connected are stacked on the support mechanism 4 and are pressed by blank holder 3;

2) Contact stage: the driving mechanism 2, feeds axially until the end 206 of the rivet body is 1 mm away from the surface of the upper layer of workpiece 12 to be connected. The process parameters for said axial feed are as follows: the rivet rotates clockwise at the speed of 2000 revolutions/minute, the feed speed is 2 mm/s, and the semi-hollow rivet 11 is driven to feed and rotate close to the workpiece 12 to be connected at the same time, until the semi-hollow rivet 11 is connected with the upper layer of workpiece 12 to be connected;

3) Cutting stage: the semi-hollow rivet 11 pierces into and gradually cuts off the workpiece 12 to be connected on the upper layer. After the workpiece 5 to be connected on the upper layer is deformed, part of the semi-hollow rivet 11 flows along the outer wall 209 of the rivet body to the surface of the workpiece 12 to be connected onto the outer side of the semi-hollow rivet 11 to form extruded material 15, and the other part is held by the inner cavity 204 of the rivet body to form retained material 14. After retained material 14 fills up the inner cavity of the rivet body, the retained material 14 flows along the penetration structure 210 of the rivet body to the outside of the rivet body, reducing the gap between the workpieces 12 and 13 to be connected due to the extrusion of the retained material 14 or the deformation of the bottom of the lower layer of workpieces 13 to be connected;

4) Welding stage: the semi-hollow rivet 11 pierces into the lower layer of workpiece 13 to be connected. By adjusting the rotation and feed parameters of the semi-hollow rivet 11 to 4000 rpm and 1 mm/s, the friction heat production is increased. The retaining material 14 is welded with the lower layer of workpiece 13 to be connected under the action of friction heat. The retaining material 14 of the rivet body cavity 204 and the lower layer of workpiece 13 to be connected form a welding area 16;

5) Pressing stage: the rivet shoulder 202 contacts the upper layer of workpiece 5 to be connected, holds the extrusion material 15 in the groove 207, and presses the upper layer of workpiece 13 to be connected; until the semi-hollow rivet 11 reaches the predetermined depth of 4.5 mm, the movement stops, and the drive component 2 will feed backwards and return to the original position. The blank holder 3 will be released, and a flat bottomed non-detachable joint 17 will be formed.

The said welding area 16 is the welding between the silicon coupling agent and the interception material 14 on the surface of the lower layer of workpiece 13 to be connected, and the mechanical interlocking between the lower layer of workpiece 13 to be connected and the retained material 14 due to deformation.

Figure 7:
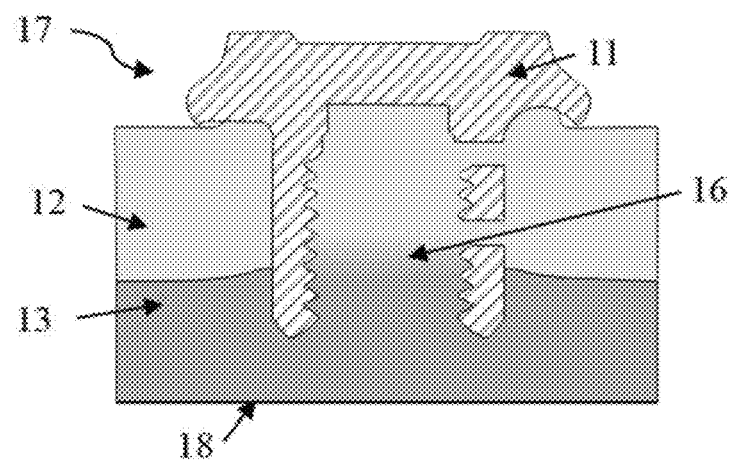
FIG. 7 is the effect diagram of Embodiment 2.

As shown in FIG. 7, in the flat bottomed and non-detachable joint 17 obtained by the above process, the thread 208 of the inner cavity of the rivet body forms a threaded connection with the upper layer of workpiece 12 to be connected and the lower layer of workpiece 13 to be connected, the rivet body penetration structure 210 forms a mechanical interlocking with the upper layer of workpiece 12 to be connected, the rivet body 103 forms an aluminum iron solid connection with the workpiece 12 to be connected, and the workpieces 12 and 13 to be connected form a welding joint. The bottom surface 18 of the joint is flat and flush with the lower layer of workpiece 13 to be connected.

Compared with the prior art, (1) for aluminum alloy 2219-T4 with a thickness of 3.0 mm and CFRP with a thickness of 2.5 mm, the CFRP on the bottom surface of the joint obtained in this embodiment has no obvious deformation, crack, penetration and is flush with the surface of the material to be connected, which improves the aerodynamic performance and corrosion resistance of the joint, facilitates the covering processing on the bottom surface of the joint, and expands the application range of the process; (2) The aluminum alloy is reliably connected to the composite material through thread, mechanical interlocking and welding, with the maximum tensile shear of the joint being 3.9 kN, which is 27% higher than that of the self-piercing riveting process; (3) In the joint, the rivet shoulder stiffener is embedded in the upper layer of the material to be connected, and the perforating structure of the rivet body is connected with the material to be connected to achieve mechanical interlocking to avoid loosening of the joint during service, which can effectively improve the fatigue performance; (4) The maximum riveting force in the riveting process is 4.9 kN, which is 90.5% lower than the existing 41.2 kN riveting force using the traditional self-piercing riveting method, effectively reducing the wear and tear of riveting equipment.

Embodiment 3

Figure 8A:
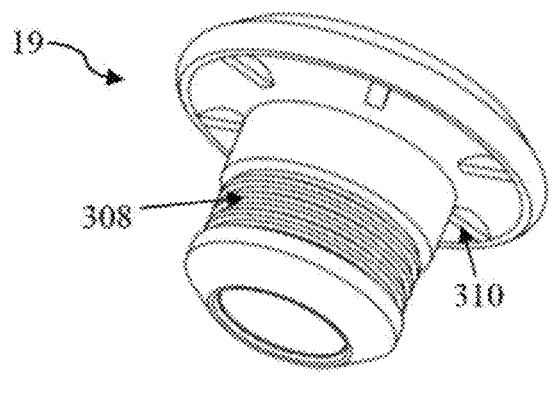
FIG. 8A is the 3D schematic diagram of the semi-hollow rivet in Embodiment 3.
Figure 8B:
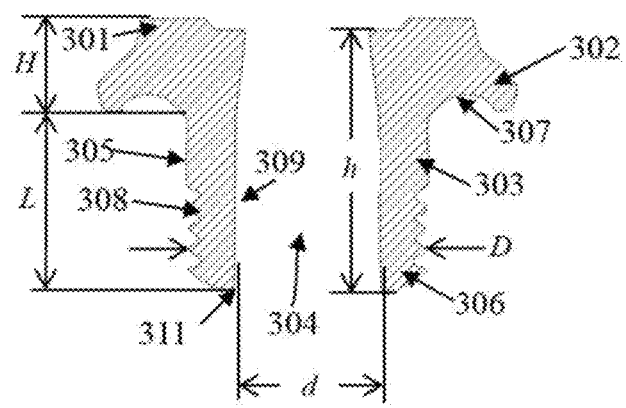
FIG. 8B is the sectional schematic diagram of the semi-hollow rivet in Embodiment 3.
Figures 9A, 9B, 9C, 9D, 9E:
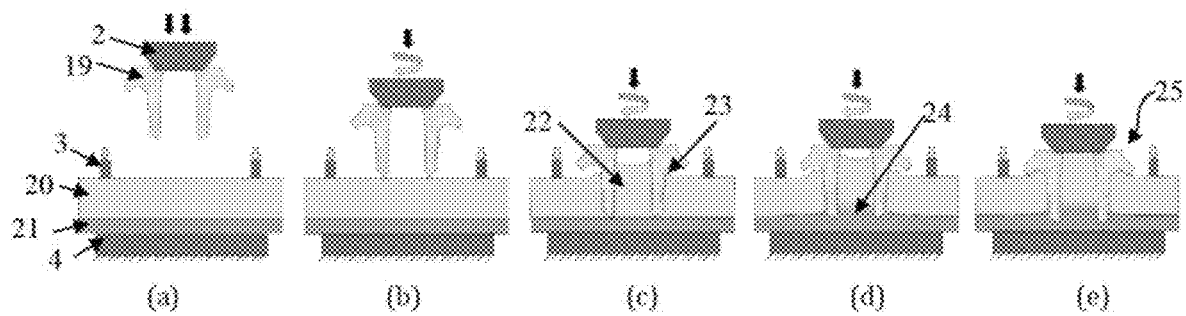
FIG. 9A is the schematic diagram of the three-spot joining method in the Embodiment 3, the process preparation stage.
FIG. 9B is the schematic diagram of the three-spot joining method in the Embodiment 3, the contact stage.
FIG. 9C is the schematic diagram of the three-spot joining method in the Embodiment 3, the cutting off stage.
FIG. 9D is the schematic diagram of the three-spot joining method in the Embodiment 3, the tightening stage.
FIG. 9E is the schematic diagram of the three-spot joining method in the Embodiment 3, the pressing stage.

As shown in FIG. 8A-B, compared with Embodiment 1, in this embodiment, the rivet shoulder 302 is provided with six stiffeners 310 evenly distributed in the circumferential direction; the outer wall 305 of the rivet body is provided with an interlocking structural groove 308 with a depth of 0.4 mm and a length of 3.0 mm from the end 311 of the rivet body. The inner cavity of the rivet body is a through hole to hold the deformed workpiece material in the inner cavity of the rivet, and avoid excessive extrusion of uneven deformation at the bottom of the joint.

As shown in FIG. 9A-E, this embodiment relates to a spot joining method for forming a flat bottomed non-detachable joint with a semi-hollow rivet 19, wherein the upper layer of workpiece 20 to be connected is an aluminum alloy casting with a thickness of 3.0 mm, while the lower layer of workpiece 21 to be connected is an aluminum alloy sheet 5182-0 with a thickness of 1.8 mm. This embodiment specifically includes the following steps:
1) Process preparation: the upper layer of workpiece 20 to be connected and the lower layer of workpiece 21 to be connected are stacked on the support mechanism 4 and are pressed by blank holder 3;
2) Contact stage: the driving mechanism 2, feeds axially until the end 306 of the rivet body is 1 mm away from the surface of the upper layer of workpiece 20 to be connected. The process parameters for said axial feed are as follows: the rivet rotates clockwise at the speed of 3000 rpm, the feed speed is 3 mm/s, and the semi-hollow rivet 19 is driven to feed and rotate close to the workpiece 20 to be connected at the same time, until the semi-hollow rivet 19 is connected with the upper layer of workpiece 20 to be connected;
3) Cutting stage: the semi-hollow rivet 19 pierces into and gradually cuts off the upper layer of workpiece 20 to be connected. After the deformation of the upper layer of workpiece 5 to be connected, part of the cut off material flows along the outer wall 305 of the rivet body to the surface of the workpiece 20 to be connected on the outer side of the semi-hollow rivet 19 to form extruded material 23, and the other part is held by the inner cavity 304 of the rivet body to form retained material 22.
4) Welding stage: the semi-hollow rivet 19 pierces into the lower layer of workpiece 20 to be connected. By adjusting the rotation and feed parameters of the semi-hollow rivet 19 to 6000 rpm and 0.5 mm/s, the friction heat production is increased, and the thermocouple is used to measure the temperature at the bottom center of the lower layer of workpiece 21 to be connected. When the temperature rises to 150° C., the feed speed shall be raised to 2.0 mm/s; through this process, the retaining material 22 is welded with the lower layer of workpiece 21 to be connected while the retaining material 22 in the rivet body cavity 304 forms a welding area 24 with the lower layer of workpiece 21 to be connected;
5) Pressing stage: the rivet shoulder 302 contacts the upper layer of workpiece 5 to be connected, holds the extrusion material 23 in the groove 307, and presses the upper layer of workpiece 20 to be connected; until the semi-hollow rivet 19 reaches the predetermined depth of 3.5 mm, the movement stops, and the drive component 2 will feed backwards and return to the original position. The blank holder 3 will be released, and a flat bottomed non-detachable joint 25 will be formed.

Figure 10:
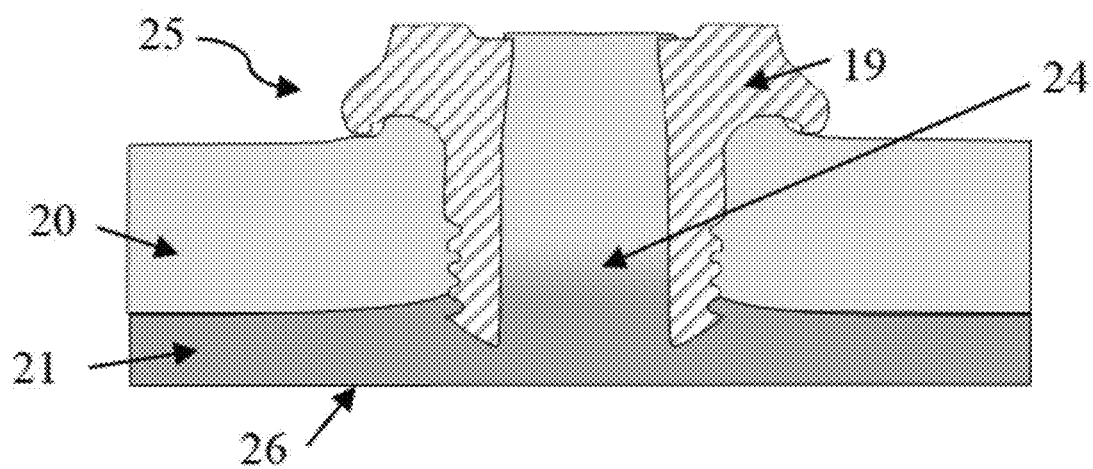
FIG. 10 is the effect diagram of Embodiment 3.

As shown in FIG. 10, in the flat bottomed non-detachable joint 25 obtained by the above process, the thread 308 of the outer wall of the rivet body forms a threaded connection with the upper layer of workpiece 20 to be connected and the lower layer of workpiece 21 to be connected, the rivet body penetration structure 210 forms a mechanical interlocking with the upper layer of workpiece 12 to be connected, the rivet body 303 forms an aluminum iron solid connection with the workpiece 20 to be connected, and the workpieces 20 and 21 to be connected form a welding joint. The bottom surface 26 of the joint is flat and flush with the lower layer of workpiece 21 to be connected.

Compared with the prior art, (1) as for the 3.0 mm thick aluminum alloy casting and 1.8 mm thick aluminum alloy sheet 5182-0, the bottom surface of the joint obtained in this embodiment has no deformation, cracking, or penetration, and is flush with the surface of the material to be connected, which improves the corrosion resistance of the joint, facilitates the covering processing of the bottom surface of the joint, and expands the application scope of the process; (2) Under the softening of friction heat in the riveting process, the deformation ability of brittle cast aluminum alloy materials is improved without cracking; (3) The aluminum alloy casting can be reliably connected to the sheet through thread and solid phase welding, with the maximum tensile-shear force of the joint being 5.2 kN, which is 21% higher than the 4.3 kN of the self-piercing riveting process; (4) The fatigue life of the joint under high cycle tension is 350,000 times under 2.6 kN load, which is 40% higher than the 250,000 times of the traditional self-piercing riveting joint under the same load.

Compared with the prior art, the present invention significantly reduces the maximum riveting force, reduces the loss of riveting equipment, increases the maximum tensile shear force of the joint, improves the sealing property of the joint, and eliminates the uneven deformation at the bottom of the joint.

The above specific embodiments may be partially adjusted by the technical personnel in the field by different ways without deviating from the principle and purpose of the invention. The scope of protection of the invention shall be subject to the claims and shall not be limited by the above specific embodiments, and each embodiment within the scope shall be subject to the invention.

What is claimed is:

1. A rivet with improved structure for forming flat-bottom riveting of plates used for spot joining process, comprises a rivet cover, a rivet shoulder and a rivet body, wherein the rivet cover is provided with a torque transmission structure and a positioning structure for driving the rivet to rotate; the rivet body comprises an inner cavity of the rivet body, an outer wall of the rivet body and an end of the rivet body;

the said inner cavity depth of the rivet body h meets the following requirements: h–L≤H, wherein H is the thickness of the rivet cover, D is the outer wall diameter of the rivet body, and d is the inner cavity diameter of the rivet body;

the length L of the said rivet body and the thickness and layers of the workpiece to be connected meet the formula $\Sigma_{i=1}^{n-1} t_i < L \leq \Sigma_{i=1}^{n} t_i'$, wherein $t_i$ is the thickness of the i-th layer of the workpiece to be connected, n is the number of layers of the workpiece to be connected, and n≥1; and the said inner and outer walls of rivet body are provided with a rivet body penetration structure, which can form a plurality of through holes on the rivet body and is used to discharge the to-be-connected materials trapped in the inner cavity of the rivet body to the outside of the body during the riveting process, so as to prevent forming gaps between the workpieces or deformation of the bottom of the joint as a result of trapped materials squeezing the workpieces to be connected once the cavity of the rivet body is filled with such materials.

2. The rivet with improved structure according to claim 1, in which there are 3-6 of the said through holes uniformly distributed along the circumference of the rivet body, with a diameter of 0.8 to 1.2 times of the wall thickness of the rivet body, and the said through holes are to be filled with the material of the workpieces to be connected in the final joint, forming mechanical interlocking to increase the locking force of the joint and prevent it from loosening.

3. The rivet with improved structure according to claim 1, in which said rivet shoulder is provided with a groove for holding the materials from the workpieces to be connected which are extruded during the rivet pressing process, and the volume of the groove is $$V_{groove} = k_1 \frac{\pi(D^2 L - d^2 h)}{4},$$

wherein D is the outer wall diameter of the rivet body, d is the inner cavity diameter of the rivet body, L is the length of the rivet body, h is the cavity depth of the rivet body, and $k_1$ is the correction factor and $1.0 < k_1 \leq 1.2$.

4. The rivet with improved structure according to claim 1, in which the said rivet shoulder is further provided with some stiffeners which will be embedded into the workpieces to be connected in the final joint, in order to fasten the joint in the circumferential direction.

5. The rivet with improved structure according to claim 1, in which the said outer wall and the inner cavity of rivet body are provided with an interlocking structure, in order to form interlocking with the connected materials to prevent the joint from loosening.

6. A spot joining device based on the rivet with improved structure according to claim 1, comprises a driving component, a blank holder and a support mechanism, wherein the semi-hollow rivet, the driving component and the blank holder are coaxially arranged on one side of the workpieces to be connected, the semi-hollow rivet is located in the blank holder and is engaged with the driving component while the support mechanism is located on the other side of the workpieces to be connected; the driving component drives the semi-hollow rivet to perform axial linear movement and/or circumferential rotary movement; and the said contact surface between the support mechanism and the nth layer of workpiece is a plane, and the projection area of the contact surface in the direction of the rivet axis covers the projection area of the entire rivet.

7. The spot joining device according to claim 6, wherein the spot joining device is used for forming a flat bottomed and detachable joint, comprises the following steps:

i) process preparation: the workpieces to be connected are stacked on the support mechanism and are pressed by a blank holder;

ii) contact stage: the driving component axially feeds until the end of the rivet body of the rivet is located above the surface of the workpiece to be connected and the driving mechanism drives the semi-hollow rivet to feed along the axial direction at the same time according to the predetermined process parameters and rotate it to the workpiece to be connected until the semi-hollow rivet contacts the workpiece to be connected;

iii) cutoff stage: Under the action of axial movement and rotary movement, the semi-hollow rivet pierces into the workpiece to be connected and cuts off all workpieces except the workpiece to be connected at the nth layer, and part of the cut material flows along the outer wall of the rivet body to the surface of the workpiece to be connected outside the semi-hollow rivet while the other part is held by the inner cavity of the rivet body to form the retained material; after filling the inner cavity of the rivet body, the retained material flows along the penetration structure of the rivet body to the outside of the rivet body, reducing the gap between the workpieces to be connected due to the extrusion of the retained material or the deformation of the bottom of the workpiece to be connected at the nth layer;

iv) welding stage: when the semi-hollow rivet pierces into the workpiece to be connected at the nth layer, the rotation and feed parameters of the semi-hollow rivet will be adjusted to make the friction heat generation greater than the heat threshold, and the retained material will be welded with the workpiece to be connected at the nth layer under the action of the friction heat, and the retained material in the inner cavity of the rivet body will form a whole with the workpiece to be connected at the nth layer;

v) pressing stage: the rivet shoulder contacts the workpiece to be connected, the extruded material is held by the groove of the rivet shoulder, and the workpiece to be connected is pressed; and vi) completion of the process: when the semi-hollow rivet reaches the predetermined depth, the movement will stop and the driving component will feed backward and return to the original position; the blank holder will be released, and a flat bottomed and non-detachable joint will be formed.

8. The spot joining device according to claim 7, in which during the said welding stage and pressing stage, the inner wall of the rivet body expands and deforms under the action of the pressure retaining material, enhancing the mechanical interlocking between the rivet body and the workpiece to be connected, and form at least one of the following welding or mechanical interlocking:
- a1) welding formed by retained material in the rivet body cavity and the nth layer of workpiece to be connected;
- b1) welding formed between the workpieces to be connected outside the rivet body;
- c1) welding formed by the rivet body and the workpiece to be connected;
- a2) mechanical interlocking formed between the interlocking structure of the inner cavity of the rivet body and the workpiece to be connected;
- b2) mechanical interlocking formed between the interlocking structure of the outer wall of the rivet body and the workpiece to be connected;
- c2) mechanical interlocking formed between the rivet body penetration structure and the workpiece to be connected;
- d2) mechanical interlocking formed by stiffeners of the rivet shoulder and the workpiece to be connected; and
- e2) mechanical interlocking between the rivet body and the material to be connected formed due to the expansion and deformation of the rivet body which results in the increase of the inner diameter of the rivet body.

9. The spot joining device according to claim 6, wherein the spot joining device is used for forming a flat bottomed and detachable joint, comprises the following steps:
- i) process preparation: the workpieces to be connected are stacked on the support mechanism and are pressed by the blank holder;
- ii) contact stage: the driving component axially feeds until the end of the rivet body of the rivet is located above the surface of the workpiece to be connected and the driving mechanism drives the semi-hollow rivet to feed along the axial direction at the same time according to the predetermined process parameters and rotate it to the workpiece to be connected until the semi-hollow rivet contacts the workpiece to be connected;
- iii) cutoff stage: Under the action of axial movement and rotary movement, the semi-hollow rivet pierces into the workpiece to be connected and cuts off all workpieces except the workpieces to be connected at the nth layer, and part of the cut material flows along the outer wall of the rivet body to the surface of the workpiece to be connected outside the semi-hollow rivet, and the other part is held by the inner cavity of the rivet body to form the retained material;
- iv) tightening stage: when the semi-hollow rivet pierces into the workpiece to be connected at the nth layer, the rotation and feed parameters of the semi-hollow rivet will be adjusted to make the friction heat generation greater than the heat threshold;
- v) pressing stage: the rivet shoulder contacts the workpiece to be connected, the extruded material of the workpiece to be connected is held by the groove of the rivet shoulder, and the workpiece to be connected is pressed; and
- vi) completion of the process: when the semi-hollow rivet reaches the predetermined depth, the movement will stop and the driving component will feed backward and return to the original position; the blank holder will be released, and a flat bottomed and detachable joint will be formed.

10. The spot joining device according to claim 9, in which at least one of the following connections or interlocking is formed, and the disassembly is realized through reverse rotation:
- a1) the thread structure of the cavity of the rivet body;
- b1) the thread structure of the outer wall of the rivet body;
- a2) the threaded connection formed between the thread structure of the inner cavity of the rivet body and the workpiece to be connected; and
- b2) the threaded connection formed between the thread structure of the outer wall of the rivet body and the workpiece to be connected.

* * * * *